United States Patent [19]
Jokinen et al.

[11] Patent Number: 6,038,238
[45] Date of Patent: Mar. 14, 2000

[54] METHOD TO REALIZE DISCONTINUOUS TRANSMISSION IN A MOBILE PHONE SYSTEM

[75] Inventors: Harri Jokinen, Hiisi; Hannu Pirilä, Raisio, both of Finland

[73] Assignee: Nokia Mobile Phones Limited, Espoo, Finland

[21] Appl. No.: 08/875,652

[22] Filed: Jul. 29, 1997

[30]  Foreign Application Priority Data

Jan. 31, 1995 [FI] Finland .................................. 950419

[51] Int. Cl.[7] .......................... H04B 7/212; H04B 15/00; H04J 3/12
[52] U.S. Cl. ......................... 370/523; 370/337; 375/202
[58] Field of Search .................................. 370/337, 336, 370/345, 347, 328, 329, 522, 523, 527, 528; 375/202

[56]  References Cited

U.S. PATENT DOCUMENTS

| | | | |
|---|---|---|---|
| 5,257,257 | 10/1993 | Chen et al. | 370/18 |
| 5,754,537 | 5/1998 | Jamal | 370/330 |
| 5,794,199 | 8/1998 | Rao et al. | 704/258 |
| 5,835,889 | 11/1998 | Kapanen | 704/215 |

FOREIGN PATENT DOCUMENTS

| | | |
|---|---|---|
| 0 593 255 | 4/1994 | European Pat. Off. . |
| 0 650 304 | 4/1995 | European Pat. Off. . |
| 0 651 523 | 5/1995 | European Pat. Off. . |

OTHER PUBLICATIONS

Change Request, Technical Specification GSM 05.02, version 3.6.1, Dec. 12, 1994.
Amendment Request No. A, Technical Specification GSM 05.02, version 4.4.1, Dec. 19, 1994.
GSM System for Mobile Communications, M. Mouly, M–B. Pautet, 1992.
British Telecom Technology Journal, vol. 8, No. 1, Jan. 1990, Hodges, "The GSM Radio Interface" p. 31–43.

*Primary Examiner*—Chi H. Pham
*Assistant Examiner*—Brenda H. Pham
*Attorney, Agent, or Firm*—Perman & Green, LLP

[57]  ABSTRACT

The object of the invention is a method to realize discontinuous transmission (DTX) in a telecommunications network, e.g. in a GSM (Global System for Mobile Communications) mobile phone network, particularly on the downlink. The disadvantage of known methods is that dummy bursts transmitted on the frequency of the broadcasting channel cause disturbing responses in a mobile phone, when frequency hopping is used. In the solution according to the invention the bursts transmitted on the frequency of the broadcasting channel are encoded so that after decoding the mobile phone prevents information contained in a dummy burst to be interpreted as speech. In this way the mobile phone responds with noise on the dummy bursts transmitted on the broadcasting frequency.

15 Claims, 6 Drawing Sheets

NUMBER OF THE TDMA FRAME

| 0 | 1 | 2 | 3 | 4 | 5 | 6 | 7 | 8 | 9 | 10 | 11 | 12 |
|---|---|---|---|---|---|---|---|---|---|----|----|----|
|   |   |   |   |   |   |   |   |   |   |    |    | A  |

| 13 | 14 | 15 | 16 | 17 | 18 | 19 | 20 | 21 | 22 | 23 | 24 | 25 |
|----|----|----|----|----|----|----|----|----|----|----|----|----|
|    |    |    |    |    |    |    |    |    |    |    |    | I  |

| 26 | 27 | 28 | 29 | 30 | 31 | 32 | 33 | 34 | 35 | 36 | 37 | 38 |
|----|----|----|----|----|----|----|----|----|----|----|----|----|
|    |    |    |    |    |    |    |    |    |    |    |    | A  |

| 39 | 40 | 41 | 42 | 43 | 44 | 45 | 46 | 47 | 48 | 49 | 50 | 51 |
|----|----|----|----|----|----|----|----|----|----|----|----|----|
|    |    |    |    |    |    |    |    |    |    |    |    | I  |

| 52  | 53  | 54  | 55  | 56  | 57  | 58  | 59  | 60 | 61 | 62 | 63 | 64 |
|-----|-----|-----|-----|-----|-----|-----|-----|----|----|----|----|----|
| SID | SID | SID | SID | SID | SID | SID | SID |    |    |    |    | A  |

| 65 | 66 | 67 | 68 | 69 | 70 | 71 | 72 | 73 | 74 | 75 | 76 | 77 |
|----|----|----|----|----|----|----|----|----|----|----|----|----|
|    |    |    |    |    |    |    |    |    |    |    |    | I  |

| 78 | 79 | 80 | 81 | 82 | 83 | 84 | 85 | 86 | 87 | 88 | 89 | 90 |
|----|----|----|----|----|----|----|----|----|----|----|----|----|
|    |    |    |    |    |    |    |    |    |    |    |    | A  |

| 91 | 92 | 93 | 94 | 95 | 96 | 97 | 98 | 99 | 100 | 101 | 102 | 103 |
|----|----|----|----|----|----|----|----|----|----|-----|-----|-----|-----|
|    |    |    |    |    |    |    |    |    |     |     |     | I   |

METHOD TO REALIZE DISCONTINUOUS TRANSMISSION IN A MOBILE PHONE SYSTEM

The object of the invention is a method to realize discontinuous transmission n a telecommnunications network. e.g. in a GSM (Global System for Mobile Communications) mobile phone network. particularly on the downlink.

The number of communication channels available in mobile phone systems based on radio technology is limited, and therefore the sane channels have to be used in several cells of the system. Transmission activity on the same channel in nearby cells will then cause an increased interference level.

Advanced mobile phone systems aim to reduce the co-channel interference and its effect on the communication quality with several methods. The most important of these are discontinuous transmission and frequency hopping, which find applications in digital systems.

In discontinuous transmission the transmission activity is decreased when there is no need to communicate information, or when the information to be communicated is substantially noise. Because in a telephone conversation the speech occurs alternately in both directions the transmission time can be lowered to about the half, which correspondingly reduces the interference level caused by the transmission activity on the same channel. When the receiver during transmission does not receive a signal of good quality it will internally produce comfort noise. However, interrupted transmission can not be used on a so called broadcasting channel (BCCH) frequency which is used for measurements on the transmission path between the base station and the mobile station, because the transmission power must be constant on-this frequency. Among other things a mobile station monitors the power level of signals received from different base stations by receiving information transmitted on the broadcasting channel. This information is used to select the base station. Dummy bursts are transmitted on this frequency when there is no need for information communication.

In frequency hopping the communication channel transmission frequency is changed e.g. by pseudorandom sequence whereby the base stations using the same frequencies have uncorrelated frequency hopping sequences. Then the effect of serious disturbance sources will be averaged on several connections.

The interference level can be very effectively reduced by using both above mentioned methods simultaneously. However, technical problems relate to the implementation of this, particularly when the channels utilizing frequency hopping also utilize the frequency of the broadcasting channel. Then also during discontinuous transmission dummy bursts are transmitted on the transmission channel, when the turn has come to use the frequency of the broadcasting channel. When the mobile station receives the respective dummy bursts it may interpret them to be normal bursts carrying speech information and then the mobile phone's response is a faulty signal instead of the comfort noise, which is heard as a disturbing sound. Due to this problem it has not been common to have information communication with discontinuous transmission on the downlink, i.e. from the base station to the mobile phone.

The object of the invention is to create a method to realize discontinuous transmission where the above disadvantages are solved. The method according to the invention is characterized in what is presented in the characterizing clause of claim 1. Preferred embodiments of the invention are presented in the dependent claims.

The invention is described below with the aid of the enclosed drawings, in which:

FIG. 2 shows bursts transmitted in the DTX mode, when frequency hopping is not used;

FIG. 3 shows bursts transmitted in the DTX mode, when frequency hopping is used;

The following notations are used in the figures:

| | |
|---|---|
| T | tail |
| D | data block |
| S | stealing bit |
| TS | training sequence |
| G | guard period |
| I | idle frame |
| A | SACCH signaling channel |
| VAD | voice activity detection |
| DTX-B | burst encoding according to the invention. |

The invention is described in further detail by examples, in which the invention is applied to the GSM system. Therefore we below first consider the frame structure of the GSM system and the realization of discontinuous transmission and frequency hopping in the realized system. The GSM system is further described i.a. in the following publications: M. Mouly, M-B. Pautet: The GSM System for Mobile Communications, 1992; and British Telecom Technology Journal, vol 8, no 1, January 1990, M. R. L. Hodges "The GSM Radio Interface", p. 31–43.

Figure 1:
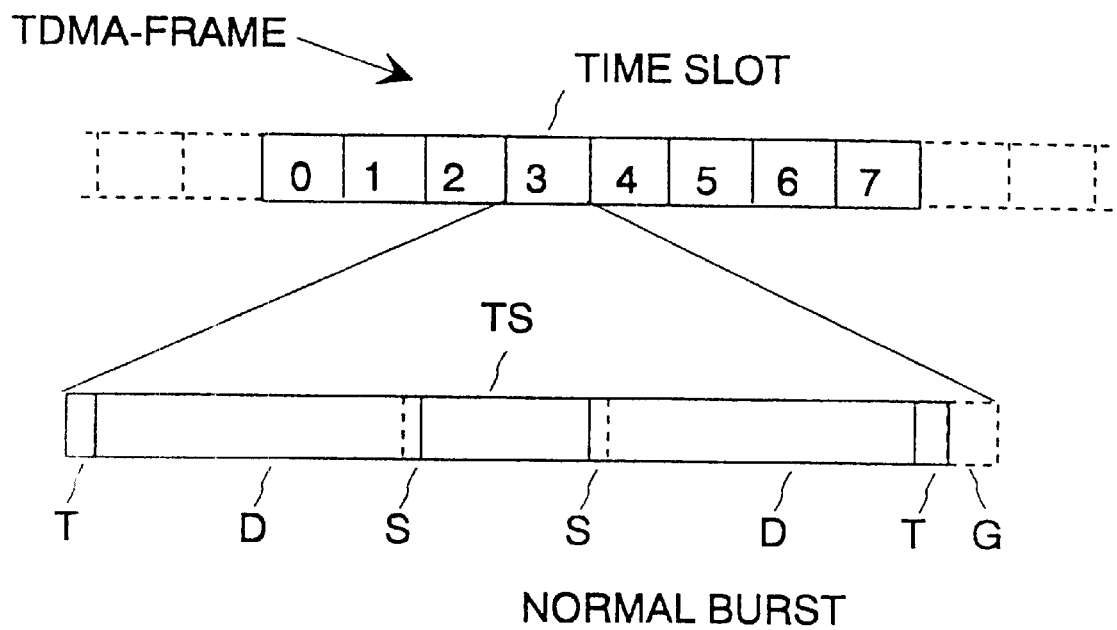
FIG. 1 shows the structure of the TDMA frame of the GSM system.

The GSM system is a Time Division Multiple Access System (TDMA) which utilizes several transmission frequencies. FIG. 1 shows the frame structure used in the system. One TDMA frame has eight time slots, and one transmission channel burst can be transmitted in each time slot. A so called normal burst comprises two blocks of 58 bits for the transmission of information. One bit of each block, the so called "stealing bit" indicates whether the block carries data or signaling information. In addition to the above blocks there is in the middle of the burst a training sequence of 26 bits, and at both ends of the burst there are 3 tail bits. Besides there is between two bursts a guard period which corresponds to a period of 8.25 bits.

The speech signal is divided in speech frames comprising eight blocks of 57 bits. These speech frames are transmitted in an interleaved form, so that each burst contains one block from two consecutive speech frames. Thus one speech frame is transmitted in eight consecutive bursts. The first four of these bursts thus contain also data from the prior speech frame, and the last four also contain data of the next speech frame. It is to be noted that the bits of two data blocks to be transmitted are interleaved on both sides of the training sequence. Of course the speech frame can also contain other information than speech. Below a "frame" and a "speech frame" refer to this frame of transmitted information, and a frame comprising time slots of different transmission channels is called a "TDMA-frame".

The training sequence is used to measure the response of the channel and to adapt the receiver to channel burst by burst. The GSM system defines eight different training sequences. They have good autocorrelation characteristics, so that the channel response can be defined by correlation measurement only. In addition the training sequences have a low cross correlation, so that there should be low interference of the same channel in a synchronized network. The training sequences to be used are permanently programmed in the mobile phone, and the base station informs the mobile phone of the identity of the respective training sequence to be used.

Discontinuous transmission in the GSM system is defined as follows. Voice Activity Detection VAD at the transmitter distinguishes the speech and pause parts of a connection. No speech signal is transmitted during a pause, and below this state is called the "DTX-state" (Discontinuous Transmission). Correspondingly the state in which the speech signal is transmitted will be called the "normal state" in the following.

When the receiver detects that the transmitter has not transmitted speech frames it marks the frame as "bad", which is called the BFI function (Bad Frame Indication). The receiver generates noise during this period, so that an interrupted input signal would not be heard as a broken connection in the receiver. During the DTX state the transmitter transmits instead of speech the parameters describing the nature of the noise. However, the transmission of these parameters requires only a negligible amount of data, and thus a short transmission time compared to speech transmission. The noise parameters are transmitted in so called SID frames (Silence Information Description).

Below we consider the DTX state when the broadcasting channel frequency is not used. When the transmitter enters the DTX state it transmits a SID frame after the last speech frame, and thereafter regularly one SID frame at intervals of 480 ms. FIG. 2 shows this multiframe comprising 104 TDMA frames and having a duration of 480 ms. The signaling channel SACCH (Slow Associated Control Channel) remains active also in the DTX state. One SACCH frame is transmitted during said period of 480 ms, and it uses four time slots A. The continuing DTX state is thus periodic regarding the use of time slots, and it contains always four active SACCH bursts and the SID frame transmitted in eight bursts. No other bursts are transmitted. On the other hand in the normal state one time slot is transmitted for each TDNA frame, with the exception of the so called idle frames I.

The information of the speech frame is diagonally interleaved in eight time slots, so a new speech frame begins at every fourth TDMA frame, and each speech frame is transmitted in eight time slots. Thus one burst will always carry data of two speech frames. The receiver must distinguish the frames which were not transmitted in the DTX state and mark them as bad frames (BFI; Bad Frame Indication). Then the speech encoder generates background noise during the DTX state. There are several means with which the receiver can identify bad frames. The most common way is to use burst quality measurement along with other means.

According to one embodiment the receiver separately measures the quality of speech frame halves, the so called half-frames. If either half-frame has at least one block which is read from a burst with good quality, then the receiver usually interprets the speech frame obtained in this way as a good frame and reproduces it.

In the situation shown in FIG. 2 the speech frames, all blocks of which would be included in the TDMA frames 0 to 50 and 60 to 102, are not transmitted at all in the DTX state. Thus the receiver interprets all these speech frames as bad frames and replaces them with noise.

The speech frame before the SID frame comprises four time slots during which no burst is transmitted, and four time slots which transmit the information of the SID frame. The speech frame after the SID frame corresponds to the speech frame before the SID frame. Thus the receiver must also mark these incomplete frames as bad frames.

Let us now consider the speech frame of FIG. 2, which would be transmitted in the TDMA frames 47 to 55. SID information is transmitted in the TDMA frames 52 to 55, so the respective bursts are transmitted. Thus the receiver of the later half-frame of the speech frame could falsely interpret a bad frame as a good frame. Bursts corresponding to the first half of the speech frame will however not be transmitted at all, so this half-frame is determined as a bad one. Because the first half-frame of this speech frame is bad, and the second half-frame is good, the receiver will interpret the whole speech frame as bad. Correspondingly the speech frame which would be transmitted in the TDMA frames 56 to 63 comprises a first half-frame, which is determined as a good frame, and a second half-frame which is determined as a bad one. The signaling frames A have no effect on the DTX function. In the situation shown in FIG. 2 the receiver will thus process all speech frames as bad frames.

Figure 3:
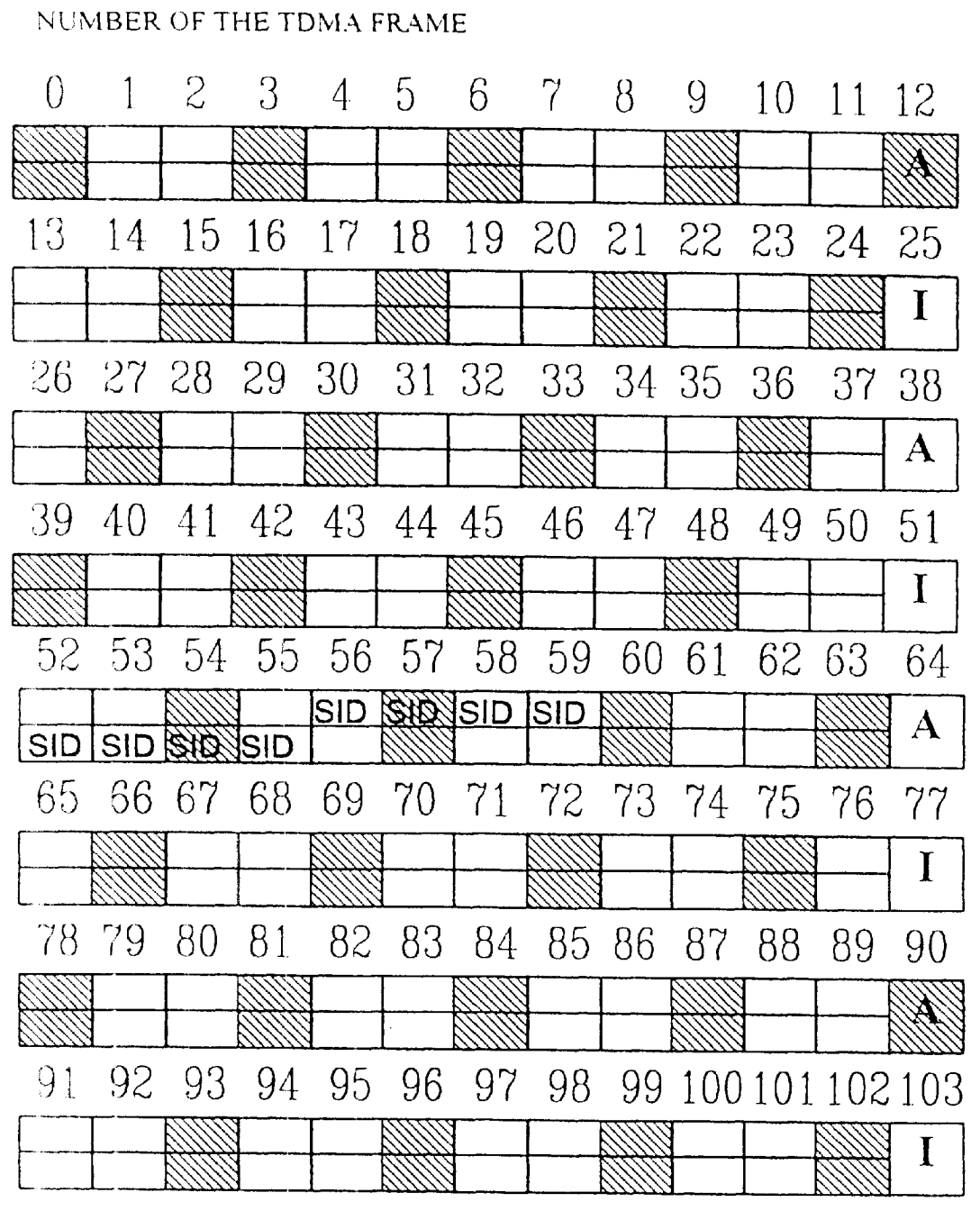

FIG. 3 shows a situation where the discontinuous transmission is used on the downlink, and frequency hopping is used on the communication channel so that one of the used frequencies is the broadcasting channel frequency. Three frequencies are used in the situation shown in the figure, and the frequency is regularly changed, so that three consecutive time slots always correspond to three different frequencies. The time slots falling on the broadcasting channel are darkened.

When discontinuous transmission is used in combination with frequency hopping the base station transmits on the BCCH carrier dummy bursts in the DTX state. Let's again consider the speech frame, which in the normal state would be transmitted in the TDMA frames 47 to 55. The bursts are transmitted in the time slots of the TDMA frames 52 to 55, because they carry the SID information. Thus the second half of the speech frame is determined as a good one in the mobile phone. The first half-frame transmitted in the TDMA frames 47 to 50 contains the time slot transmitted in the TDMA frame 48, in which a dummy burst is transmitted, because the time slot occurs at the frequency of the broadcasting channel. The receiver determines this burst as a good one, and because the first half-frame thus contains one block determined as a good one the mobile phone could determine also the first half-frame as a good one. Thus it is possible to interpret the whole speech frame as a good one, even when the blocks transmitted in the dummy bursts do not contain real information.

Correspondingly a speech frame which in the normal state would be transmitted in the TDMA frames 56 to 63 would be interpreted as a good one, because the two blocks of the second half-frame (the TDMA frames 60 and 63) are included in the dummy bursts transmitted on the frequency of the broadcasting channel.

Further a speech frame which in the normal state would be transmitted in the TDMA frames 0 to 7 comprises a first half-frame, in which the dummy bursts are transmitted in the time slots of the TDMA frames 0 and 3, and a second half-frame, in which a dummy burst is transmitted in the time slots of the TDMA frame 6. Thus also this speech frame could be falsely interpreted as a good frame in the mobile phone.

The half-frames of the speech frames contain in the above described case always 1 to 4 bursts which do no contain information, but which have a good signal quality. When a pseudo-random hopping sequence is used even all blocks of a whole speech frame could be transmitted, though they do not contain speech. In such cases the bad frame identification based on the burst quality measurement will not work in a mobile phone. This fault in the BFI function causes a response of bad quality in the mobile phone because several speech frames will pass the Cyclic Redundancy Check CRC even when they do not contain speech. The bad frame indication base on the burst quality measurement could be different from the above presented solution, but a corresponding problem occurs also with other known alternative solutions.

The fundamental idea of the invention is that the dummy bursts transmitted on the frequency of the broadcasting channel are encoded so that the mobile phone is controlled to process the frames read out from the dummy bursts as bad frames, whereby we can avoid to reproduce faulty data as speech frames containing information.

Figure 4:
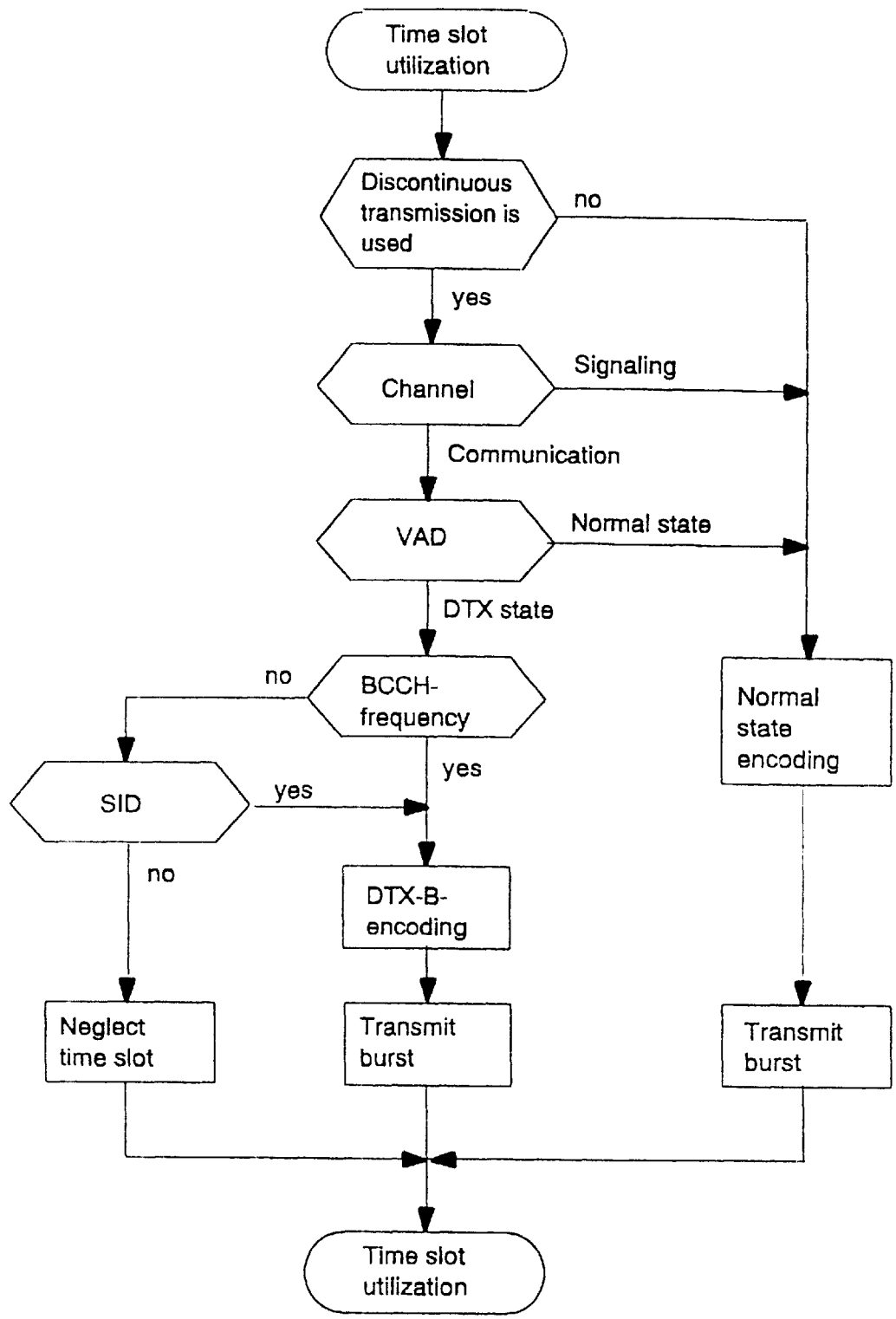
FIG. 4 shows a method according to the invention in the form of a flow diagram.

FIG. 4 shows encoding of a TDMA frame when using the method according to the invention. If the base station uses discontinuous transmission on the downlink the voice activity detection VAD measures to know whether the transmitted information is speech. The burst is encoded as in the normal state and then transmitted if the information is speech, or if no discontinuous transmission is used, or if the time slot belongs to a BCCH carrier. A switch to the DTX state is made if the VAD detects a speech pause. Then the encoding is made based on the knowledge whether the transmitted time slot is on the frequency of the broadcasting channel. If the time slot is not on the frequency of the broadcasting channel then the burst is transmitted only if it contains a SID block, otherwise the time slot is neglected. If the time slot is on the frequency of the broadcasting channel the burst is encoded according to the invention and transmitted. The encoding according to the invention is called DTX-B.

Figure 5:
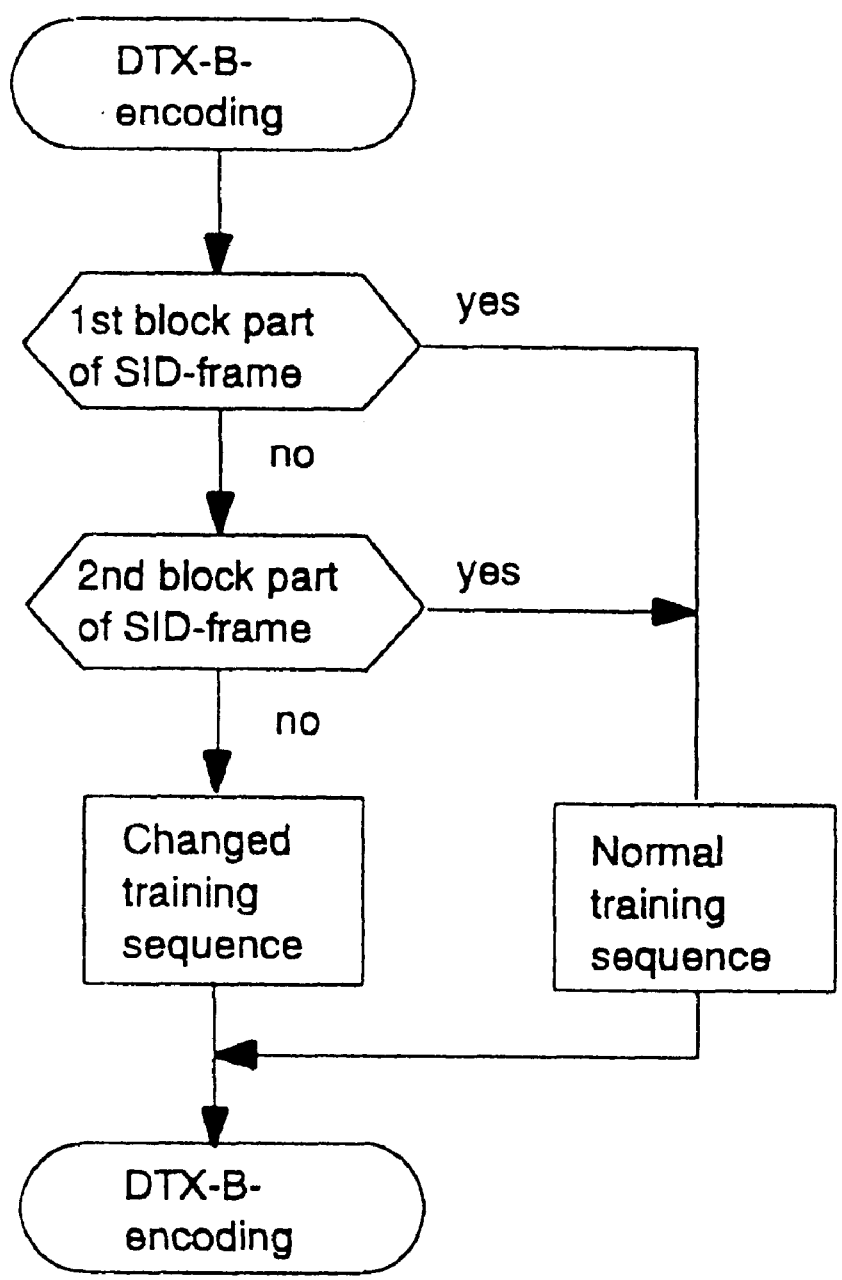
FIG. 5 shows a means to encode the burst according to the invention in the form of a flow diagram.

FIG. 5 shows a burst encoding embodiment of the invention. Here the dummy burst transmitted on the frequency of the broadcasting channel use a training sequence which differs from the training sequence used in the normal state. Then the mobile phone interprets a received block as a bad one on the basis of the correlation measurements made in the mobile phone. The new training sequence is advantageously selected so that its cross correlation with the training sequence used in normal situations is as low as possible. Then we obtain the maximum probability for the mobile phone to interpret the received block as a bad one. Of course a normal training sequence is used in those bursts which transmit blocks of the SID frame.

It is particularly advantageous to select the training sequence used in the dummy burst so that its cross correlation characteristics are very good compared to all the training sequences used in the system's normal state. Then one training sequence is sufficient for this purpose, and it can be used in the dummy bursts of all communication channels. When we select the bit sequence of the training sequence so that its cross correlation characteristics are as good with all training sequences as the cross correlation between all training sequences used earlier, then we obtain on the same channel an interference level which is as low as with other training sequences. In the GSM system we can use as the training sequence for instance the bit sequence: (BN61, BN62, . . . BN 86)=(0,1,1,1,0,0,0,1,0,1,1,1,0,0,0,1,0,1,1,1, 0,0,0,1,0,1) where BN (Bit Number) is the consecutive number of the bit in the burst.

Alternatively, for the training sequence of the dummy burst we can select another training sequence defamed in the system so that this training sequence is not the same as is used on the respective communication channel. Then the base station indicates to the mobile phone the identity of the training sequence to be used in the normal state, but uses another training sequence in the dummy bursts on the frequency of the broadcasting channel. Because the mobile phone performs a correlation measurement on the received signal related to the training sequence indicated to it, also this case results in a low correlation, and the received burst is interpreted to be bad.

Figure 6:
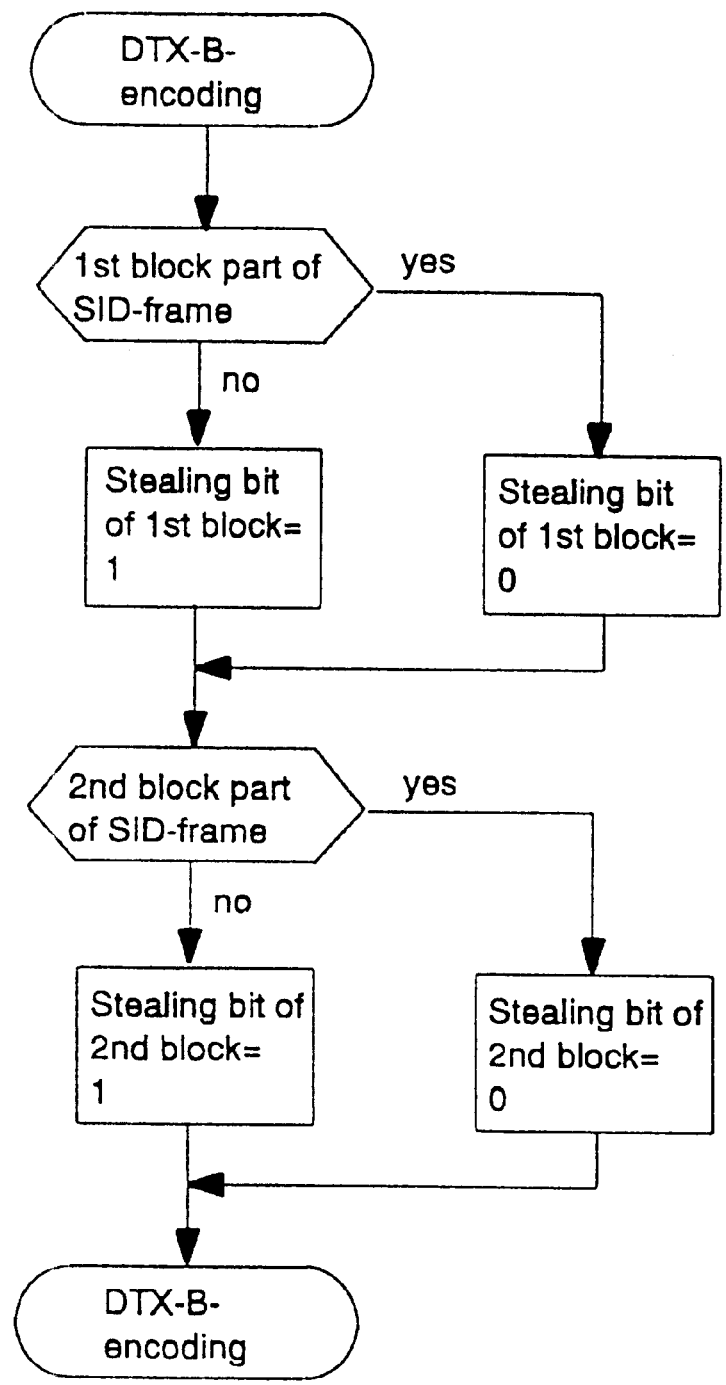
FIG. 6 shows an alternative embodiment of the means to encode the burst according to the invention in the form of a flow diagram.

FIG. 6 shows another embodiment of the encoding according to the invention. Here the parts of the speech frames transmitted during the DTX state are marked as signaling with the aid of a stealing bit. In the DTX state this stealing bit is set to the signaling state (value is 1 in the GSM system) for the speech frame blocks of bursts transmitted in connection with SID frames and for the dummy bursts transmitted on the frequency of the broadcasting channel. In the SID frame blocks the stealing bit is of course set to the data communication state (value is 0).

When a stealing bit is used all bursts containing real signal power during the DTX state are directed to the signal information receiving branch of the telephone. Because the telephone uses a powerful error check in the reception of signaling frames the frames directed to the signaling channel will be rejected, and thus they will cause no signaling errors. Interference is however avoided during discontinuous transmission, because the frames directed to the signaling are treated in the speech decoding like frames marked bad (BFI), and thus the received frames are prevented from being reproduced as speech frames containing information.

The method according to the invention provides considerable advantages over the prior art. With the method we can avoid to reproduce faulty data as speech frames in the mobile phone when discontinuous transmission is used. Even when the frequency of the broadcasting channel is used in the DTX state the mobile phone interprets the frames received from the dumuny bursts as bad and produces noise as a response to them.

This solution can be applied without any considerable modifications in the existing mobile phone population. Thus the solution provides a possibility to use discontinuous transmission on the downlink in existing systems. Thus interference on the same channel can be reduced in the system, and the communication channels can be utilized more effectively.

Above we have presented some applications of the method according to the invention. Naturally the inventive principle may be varied within the scope of the claims, e.g. regarding the details of the realization and the application area.

The invention is not limited to the GSM system, but it can also find applications in other telecommunications systems. The method is further well suited be used in the transmission of other information in addition to speech. Correspondingly, here "data" has been used to mean any kind of information transmitted in digital form.

We claim:

1. A method to realize discontinuous transmission (DTX) in a mobile phone system, with a broadcasting channel (BCCH) and communication channels transmitting speech information, in the transmission of speech information from a base station to a mobile phone having receiver circuits, comprising the steps of:

utilizing the broadcasting channel (BCCH) and the frequency of the broadcasting channel to carry the speech information transmissions of one or more communication channels by using frequency hopping, transmitting dummy bursts, comprising frames containing one or more blocks without speech information, on the frequency of the broadcasting channel, during the DTX state when speech information is not being transmitted, and during the DTX state, encoding a dummy burst that is transmitted on the frequency of the broadcasting channel in such a way that the receiver circuits of the mobile phone are controlled to process as bad frames the received frames which are read from the dummy burst and comprise one or more blocks.

2. The method according to claim 1, characterized in that, during discontinuous transmission, one or more blocks of the frame of a dummy burst transmitted on the frequency of the broadcasting channel are encoded as a signaling block.

3. The method according to claim 1, characterized in that, during the DTX state, the second block in the frames of one or more bursts, which frames have a first block being a Silence Information Description (SID) block and which frames are transmitted on the frequency of the broadcasting channel, is encoded as a signaling block.

4. The method according to claim 2, characterized in that said encoding is made with the aid of a stealing bit in the transmitted block.

5. The method according to claim 4, characterized in that the stealing bit is given the value 1 in said encoding.

6. The method according to claim 1, characterized in that, during the DTX state, the dummy bursts transmitted on the frequency of the broadcasting channel use a training sequence comprising a bit stream which is different from the training sequences transmitted on the communication channels during the normal state.

7. The method according to claim 6, characterized in that the training sequence of the dummy bursts is selected so that a received frame is treated as a bad frame based on the result of a cross correlation determination made in the mobile phone, between on one hand the received training sequence and on the other hand one or more training sequences used in the normal state.

8. The method according to claim 6, characterized in that the training sequence of the dummy bursts is selected so that a received frame is treated as a bad frame based on the result of a cross correlation determination made in the mobile phone, between on one hand the received training sequence and on the other hand a training sequence made known to the mobile phone.

9. The method according to claim 6, characterized in that the bit stream used as the training sequence of the dummy burst is selected so that its cross correlation with one or more training sequences in use is minimized.

10. The method according to claim 6, characterized in that the bit sequence (0,1,1,1,0,0,0,1,0,1,1,1,0,0,0,1,0,1,1,1, 0,0, 0,1,0,1) is used as the bit stream of the training sequence of the dummy burst transmitted on the broadcasting channel (BCCH).

11. The method according to claim 6, characterized in that the dummy burst transmitted in the DTX state on the frequency of the broadcasting channel utilizes a training sequence stored in the receiver circuits of a mobile phone, which is different from the training sequence used on a communication channel in the normal state, and the identity of which is transmitted to the mobile phone.

12. The method according to claim 11, characterized in that an encoding is performed on a burst by which the mobile phone is controlled to generate comfort noise as a response to the burst when received.

13. The use of the method according to claim 12 in the GSM system.

14. The method according to claim 3, characterized in that said encoding is made with the aid of a stealing bit in the transmitted block.

15. The method according to claim 14, characterized in that the stealing bit is given the value 1 in said encoding.

* * * * *